United States Patent
Sawarkar et al.

(10) Patent No.: US 8,810,231 B2
(45) Date of Patent: Aug. 19, 2014

(54) SYSTEM AND METHOD FOR SWITCHING VOLTAGE REGULATOR TO REDUCE RIPPLE IN OUTPUT VOLTAGE

(75) Inventors: Prasad Sawarkar, Bangalore (IN); Srinivasa Reddy Chokka, Bangalore (IN)

(73) Assignee: LSI Corporation, San Jose, CA (US)

( * ) Notice: Subject to any disclaimer, the term of this patent is extended or adjusted under 35 U.S.C. 154(b) by 464 days.

(21) Appl. No.: 13/205,631

(22) Filed: Aug. 9, 2011

(65) Prior Publication Data

US 2013/0038311 A1     Feb. 14, 2013

(51) Int. Cl.
*G05F 1/00* (2006.01)
*H02M 3/156* (2006.01)
*H02M 1/00* (2006.01)

(52) U.S. Cl.
CPC ............................ *H02M 3/156* (2013.01); *H02M 2001/0025* (2013.01)
USPC ............................................ 323/288; 323/271

(58) Field of Classification Search
USPC .................... 323/242, 271, 282, 288
See application file for complete search history.

(56) References Cited

U.S. PATENT DOCUMENTS

| | | | | |
|---|---|---|---|---|
| 7,132,820 B2 * | 11/2006 | Walters et al. | ................ | 323/288 |
| 7,457,140 B2 * | 11/2008 | Klein | ............................ | 363/132 |
| 7,595,624 B2 * | 9/2009 | Tateishi et al. | ................ | 323/288 |
| 7,868,598 B2 * | 1/2011 | Ishino | ........................... | 323/282 |
| 8,169,205 B2 * | 5/2012 | Chen et al. | ..................... | 323/282 |
| 8,441,231 B2 * | 5/2013 | Menegoli et al. | ............. | 320/128 |
| 2010/0052640 A1 * | 3/2010 | Ryoo | ............................ | 323/288 |

* cited by examiner

*Primary Examiner* — Adolf Berhane
*Assistant Examiner* — Emily P Pham
(74) *Attorney, Agent, or Firm* — Mendelsohn, Drucker & Dunleavy, P.C.; Steve Mendelsohn (57) ABSTRACT

A system and method for controlling ripple in an output voltage of a switching regulator is described. In one embodiment, the method includes providing a ramp circuit to selectively charge and discharge a ramp capacitor. The ramp capacitor provides a ramp voltage. The ramp voltage is selectively added to the output voltage to generate a summation voltage. The summation voltage is compared to a reference voltage to generate a control signal. An input voltage is coupled to an LC circuit based on the control signal. The LC circuit provides the output voltage. The input voltage is selectively coupled to the LC circuit when the ramp capacitor is selectively charged.

17 Claims, 5 Drawing Sheets

SYSTEM AND METHOD FOR SWITCHING VOLTAGE REGULATOR TO REDUCE RIPPLE IN OUTPUT VOLTAGE

FIELD OF TECHNOLOGY

Embodiments of the present invention relate to switching regulators. More particularly, embodiments of the present invention relate to pulse frequency modulated (PFM) switching regulators.

BACKGROUND

PFM switching regulators generally include a reference voltage source, a comparator circuit, a PFM control circuit, p-channel MOSFET (PMOS) switch, n-channel MOSFET (NMOS) switch, an input voltage source, a LC circuit with an off-chip Inductor and an off-chip capacitor. The output voltage of the PFM switching regulator is coupled to a load. The output voltage of the PFM switching regulator is compared with the reference voltage by the comparator circuit to generate a control signal to the PFM control circuit. Based on the control signal, the PFM control circuit selectively turns on PMOS switch or NMOS switch to maintain a near constant output voltage, in addition to supplying the load current.

As one skilled in the art appreciates the selective switching of the PMOS switch or NMOS switch generates a ripple on the output voltage. The ripple on the output voltage is about twice the hysteresis of the comparator circuit.

SUMMARY

A system and method for controlling ripple in an output voltage of a switching regulator is described. In one embodiment, the method includes providing a ramp circuit to selectively charge and discharge a ramp capacitor. The ramp capacitor provides a ramp voltage. The ramp voltage is selectively added to the output voltage to generate a summation voltage. The summation voltage is compared to a reference voltage to generate a control signal. An input voltage is coupled to an LC circuit based on the control signal. The LC circuit provides the output voltage. The input voltage is selectively coupled to the LC circuit when the ramp capacitor is selectively charged.

In yet another embodiment, a switching regulator is disclosed. The switching regulator includes a ramp circuit that is configured to selectively charge and discharge a ramp capacitor. The ramp capacitor provides a ramp voltage. A summation circuit adds the ramp voltage to an output voltage of the switching regulator to generate a summation voltage. A comparator circuit compares the summation voltage to a reference voltage to generate a control signal. A PFM control circuit is configured to couple an input voltage to an LC circuit based on the control signal. The LC circuit provides the output voltage. The input voltage is selectively coupled to the LC circuit, when the ramp capacitor is selectively charged.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for a switching regulator are disclosed. In the following detailed description of the embodiments of the invention, references are made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
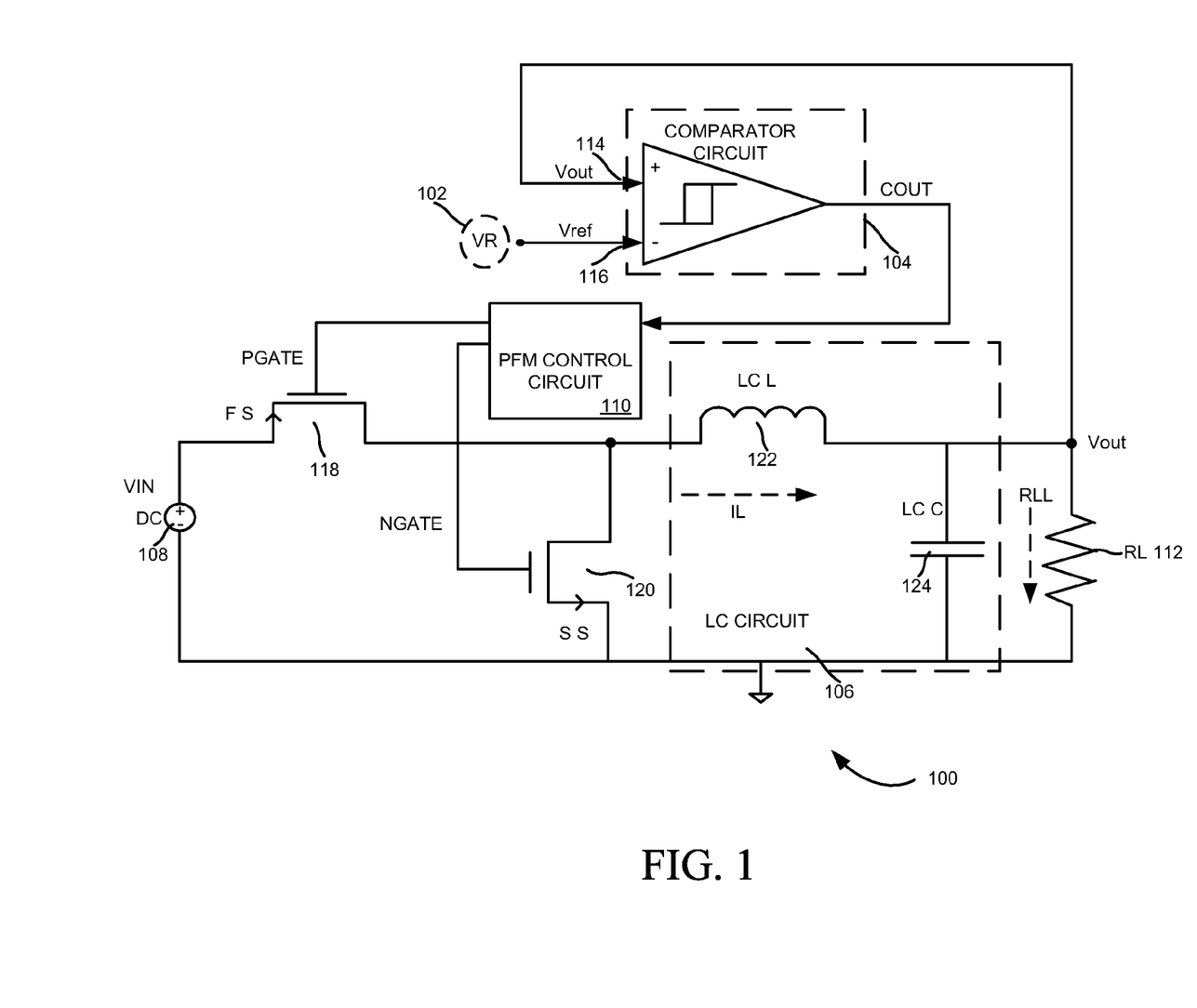
FIG. 1 illustrates an exemplary PFM switching regulator according to one embodiment.

FIG. 1 illustrates an exemplary PFM switching regulator system 100 according to an embodiment of this disclosure. PFM switching regulator system 100 includes a reference voltage source 102, a comparator circuit 104, a PFM control circuit 110, an LC circuit 106, a first switch 118, a second switch 120, an input voltage source 108. The LC circuit 106 includes a LC inductor 122, and a LC capacitor 124. The output voltage Vout of the PFM switching regulator is coupled to a load RL 112. The comparator circuit 104 includes a non-inverting input 114 and an inverting input 116. The output voltage Vout of the PFM switching regulator 100 is coupled to the non-inverting input 114. Reference voltage Vref from reference voltage source 102 is coupled to the inverting input 116 of the comparator circuit 104. The comparator circuit 104 is configured to compare the output voltage Vout with the reference voltage Vref and generate an output control signal Cout, based on the comparison. The comparator circuit 104 has a hysteresis Hc, wherein the output of the comparator circuit 104 switches when the voltage at the non-inverting input 114 is greater than the voltage at the inverting input 116 by at least Hc.

The PFM control circuit 110 selectively operates the first switch 118 and the second switch 120, based on the control signal Cout. In one embodiment, the first switch 118 is a PMOS transistor and the second switch 120 is a NMOS transistor. The PFM control circuit 110 is configured to receive the control signal Cout and generate output signals PGATE and NGATE that are applied as gate signals to the first switch 118 and the second switch 120 respectively. The output signals of the PFM control circuit 110 are coupled to the gate of first switch 118 and the gate of second switch 120 such that when the first switch 118 is turned on, the second switch 120 is turned off and vice versa.

The LC inductor 122 and the LC capacitor 124 of the LC circuit 106 are connected in series. The LC capacitor 124 is coupled across the load RL 112. The first switch 118 selectively couples the input voltage 108 to the LC inductor 122, when the first switch 118 is turned on. The second switch 120 is also coupled to the LC inductor 122 and configured to selectively couple the LC inductor 122 to ground potential, when the second switch 120 is turned on. Voltage across the LC capacitor 124 is available as Vout.

Now, the operation of the switching regulator 100 will be described. The output voltage Vout is compared against reference voltage Vref by the comparator circuit 104. When the output voltage Vout falls below reference voltage Vref, the output of the comparator circuit 104 switches. For example, the output control signal Cout switches from a high value to a low value. Low value of output control signal Cout is sensed by the PFM Control Circuit 110. The PFM Control Circuit 110 generates corresponding gate signals PGATE and NGATE so as to turn off the second switch 120 and turn on the first switch 118. The first switch 118 now couples the input voltage 108 to the LC inductor 122. As soon as the first switch 118 is turned on, current IL starts flowing through the LC inductor 122 and the inductor starts ramping. Now, the voltage across LC capacitor 124 starts to increase thereby increases the output voltage Vout. When the output voltage Vout reaches a value at least equal to "Vref+Hc", the comparator circuit 104 switches the output control signal Cout, say from a low value to a high value.

High value of output control signal Cout is sensed by the PFM Control Circuit 110. The PFM Control Circuit 110 generates corresponding gate signals PGATE and NGATE so as to turn off the first switch 118 and turn on the second switch 120, respectively. When the first switch 118 is turned off, the input voltage 108 is decoupled from the LC Inductor 122. When the second switch 120 is turned on, the LC inductor 122 is coupled to ground by the second switch 120. The inductor current IL ramps down, as the second switch 120 is now turned on. As the inductor current IL is positive, it continues to charge the LC capacitor 124 until the inductor current IL is equal to the load current IRL. So, the ripple voltage on output voltage Vout is greater than the hysteresis Hc and may be about two times the hysteresis Hc. The peak inductor current and ripple voltage also increases with the load current. These principles will be further evident with reference to exemplary waveforms described in FIGS. 2A and 2B.

Figure 2A:
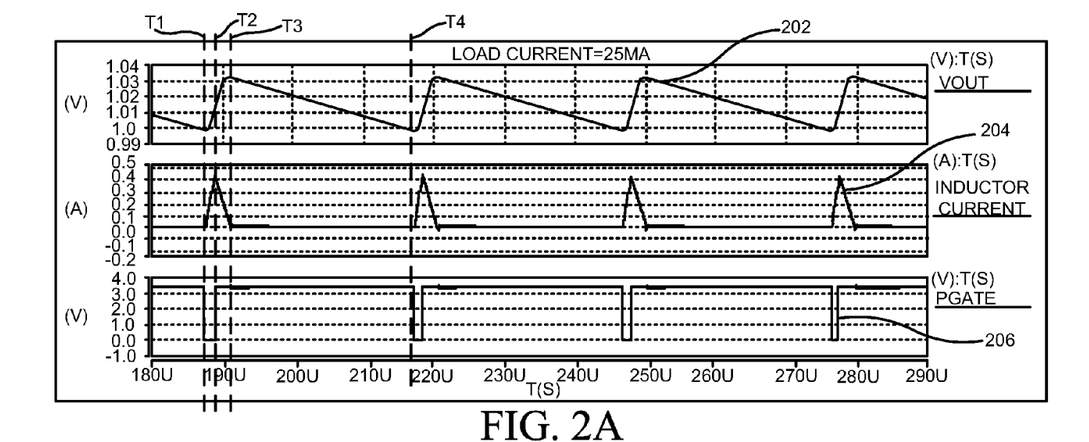
FIG. 2A illustrates voltage and current waveforms of exemplary PFM switching regulator of FIG. 1, under a low load current condition.

FIG. 2A illustrates voltage and current waveforms of exemplary PFM switching regulator 100 of FIG. 1, under a low load current condition. In this example, the load current IRL is 25 mA, reference voltage Vref=1 V and hysteresis Hc=15 mV. For example, waveform 202 depicts the output voltage Vout in Volts over time, waveform 204 depicts the inductor current IL in milliamps (mA) over time and waveform 206 depicts gate signal PGATE in Volts applied to first switch 118. X-axis depicts the time t(s) in microseconds (uSec) for all three waveforms 202-206. Now referring to FIG. 2A, at about time T1, as the output voltage Vout drops below Vref of 1 Volts, the gate signal PGATE is asserted and the first switch 118 is turned on. Then, the inductor current IL starts to ramp up. The output voltage Vout increases during this period.

When the output voltage Vout increases above Vref+Hc (here Vref=1V and Hc=15 my or 0.015 V), at about time T2, the gate signal PGATE is deasserted and the first switch 118 is turned off and second switch 120 is turned on. The inductor current IL continues to flow until it ramps down to 0 amps at time T3. The output voltage Vout continues to raise until Inductor current is equal to IRL during this period. After the inductor current IL ramps down to 0 amps at time T3, the output voltage Vout now continues to ramp down during the period T3-T4, at which time, the output voltage Vout drops below the reference voltage Vref. Until time T4, the inductor current IL is substantially zero. Then, the gate signal PGATE is asserted and the cycle as described above repeats. As one skilled in the art appreciates, the peak inductor current under these conditions is about 0.45 mA. Low inductor current is about 0 mA. The difference between the peak inductor current and low inductor current, sometimes referred to as delta inductor current is about 0.45 mA. Ripple in output voltage Vout is about 30 mV, which is greater than the hysteresis Hc of 15 mV. The switching regulator is operating in discontinuous mode, as the inductor current is substantially zero during the time period T3-T4.

Figure 2B:
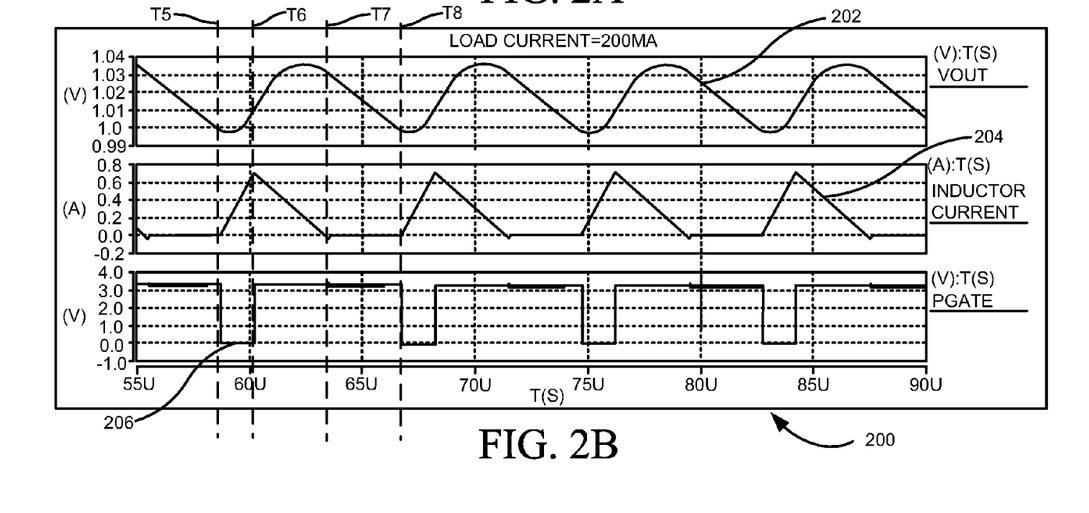
FIG. 2B illustrates voltage and current waveforms of exemplary PFM switching regulator of FIG. 1 under a high load current condition.

FIG. 2B illustrates voltage and current waveforms of exemplary PFM switching regulator 100 of FIG. 1, under a high load current condition. In this example, the load current IRL is about 200 mA. All other parameters are same, for example, reference voltage Vref=1 V and hysteresis Hc=15 mV. For example, waveform 202 depicts the output voltage Vout in Volts over time, waveform 204 depicts the inductor current IL in milliamps (mA) over time and waveform 206 depicts gate signal PGATE in Volts applied to first switch 118. X-axis depicts the time t(s) in microseconds (uSec) for all three waveforms 202-206. Now referring to FIG. 2B, at about time T5, as the output voltage Vout drops below Vref of 1 Volts, the gate signal PGATE is asserted and the first switch 118 is turned on. Then, the inductor current IL starts to ramp up. The output voltage Vout increases during this period.

When the output voltage Vout increases above Vref+Hc (here Vref=1V and Hc=15 my or 0.015 V), at about time T6, the gate signal PGATE is deasserted and the first switch 118 is turned off and second switch 120 is turned on. The inductor current IL continues to flow and ramps down to 0 amps at time T7. The output voltage Vout continues to raise until Inductor current is equal to IRL during this period. After the inductor current IL ramps down to 0 amps at time T7, the output voltage Vout now continues to ramp down during the period T7-T8, at which time, the output voltage Vout drops below the reference voltage Vref. Until time T8, the inductor current IL is substantially zero. Then, the gate signal PGATE is asserted and the cycle as described above repeats. As one skilled in the art appreciates, referring to FIG. 2B, the peak inductor current under these conditions is about 0.7 mA. Low inductor current is about 0 mA. The difference between the peak inductor current and low inductor current, the delta inductor current is about 0.7 mA. Ripple in output voltage Vout is about 35 mV, which is greater than the hysteresis Hc of 15 mV. The switching regulator is operating in discontinuous mode, as the inductor current is substantially zero during the time period T7-T8. In general, as the load current IRL increases, the peal inductor current and the ripple in output voltage Vout increases. Additionally, the delta inductor current swings from 0.45 mA to 0.7 mA, as the load current increased from 25 mA to 200 mA.

Figure 3:
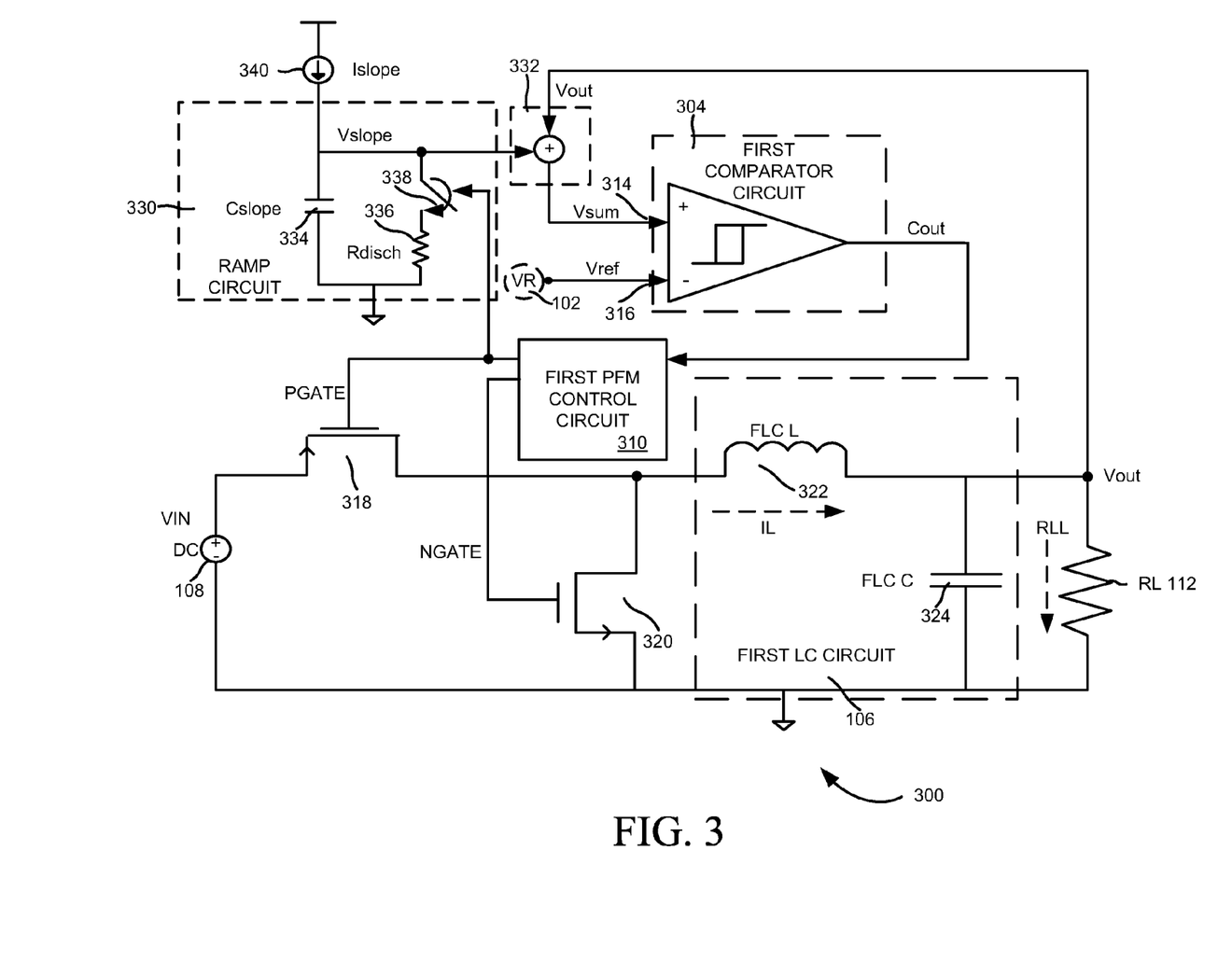
FIG. 3 illustrates an exemplary PFM switching regulator according to another embodiment.

FIG. 3 illustrates an exemplary PFM regulator system 300 according to another embodiment of this disclosure. PFM regulator system 300 includes a reference voltage source 102, a first comparator circuit 304, an input voltage source 108, a first PFM control circuit 310, a first PFM switch 318, a second PFM switch 320, a ramp circuit 330, a voltage summation circuit 332, a first LC circuit 306 with a first LC Inductor 322 and a first LC capacitor 324. The output voltage Vout of the PFM switching regulator 300 is coupled to a load RL 112. The first comparator circuit 304 includes a first non-inverting input 314 and a first inverting input 316. In one embodiment, the first comparator circuit 304, first LC circuit 306 and first PFM control circuit 310 may be similar to the comparator circuit 104, LC circuit 106 and the PFM control circuit 110 of PFM regulator system 100 of FIG. 1.

The ramp circuit 330 generates a ramp voltage Vslope. The voltage summation circuit 332 is configured to receive the ramp voltage Vslope and the output voltage Vout as input and generate a summation voltage Vsum that is proportional to the sum of the ramp voltage Vslope and output voltage Vout. In one embodiment, the summation voltage Vsum is the sum of the ramp voltage Vslope and the output voltage Vout. The summation voltage Vsum is coupled to the first non-inverting input 314. Reference voltage Vref from reference voltage source 102 is coupled to the first inverting input 316 of the first comparator circuit 304. The first comparator circuit 304 is configured to compare the summation voltage Vsum with the reference voltage Vref and generate an output control signal Cout, based on the comparison.

The first comparator circuit 304 has a hysteresis Hc, wherein the output of the comparator circuit 304 switches when the voltage difference between the voltage at the first non-inverting input 314 and the voltage at the inverting input 316 is at least Hc. However, based on the value of the ramp voltage Vslope, that is added to the output voltage Vout to generate the summation voltage Vsum, the difference between the reference voltage Vref and the output voltage Vout may be less than the hysteresis Hc, when the output of the first comparator circuit 304 switches.

The ramp circuit 330 includes a ramp capacitor 334. A discharge resistor 336 is configured to be selectively coupled across the ramp capacitor 334, through a ramp switch 338. In one embodiment, the ramp switch 338 may be a NMOS transistor. The ramp capacitor 334 is configured to be coupled to a ramp current source 340 to charge the ramp capacitor 334. The voltage across the ramp capacitor 334 is output as the ramp voltage Vslope. Further construction and operation of the ramp circuit 330 will be described later.

The first PFM control circuit 310 selectively operates the first PFM switch 318 and the second PFM switch 320, based on the control signal Cout. In one embodiment, the first PFM switch 318 is a PMOS transistor and the second PFM switch 320 is a NMOS transistor. The first PFM control circuit 310 is configured to receive the control signal Cout and generate output signals PGATE and NGATE that are applied as gate signals to the first PFM switch 318 and the second PFM switch 320, respectively. The output signals PGATE and NGATE of the first PFM control circuit 310 are configured and coupled to the gate of first PFM switch 318 and the gate of second PFM switch 320 such that when the first PFM switch 318 is turned on, the second PFM switch 320 is turned off and vice versa. In one embodiment, an output of the first PFM control circuit 310 is configured to selectively turn on and off the ramp switch 338. In one embodiment, the ramp switch 338 is a NMOS transistor and the gate signal PGATE is coupled to the gate of the NMOS transistor to selectively turn on and turn off the ramp switch 338. In one embodiment, the ramp switch 338 is turned on when the first PFM switch 318 is turned off and the ramp switch 338 is turned off when the first PFM switch 318 is turned on. So, the ramp capacitor 334 charges when the first PFM switch 318 is turned on and the ramp capacitor 334 discharges when the first PFM switch 318 is turned off.

The first LC inductor 322 and the first LC capacitor 324 are connected in series. The first LC capacitor 324 is coupled across the load RL 112. The first PFM switch 318 selectively couples the input voltage 108 to the first LC inductor 322, when the first PFM switch 318 is turned on. The second PFM switch 320 is also coupled to the first LC inductor 322 and configured to selectively couple the first LC inductor 322 to ground potential, when the second PFM switch 320 is turned on. Voltage across the first LC capacitor 324 is available as Vout.

Now, the operation of the switching regulator 300 will be described. Initially, based on the control signal Cout of the first comparator circuit 304, first PFM switch 318 is turned off and the ramp switch 338 is turned on. This causes the ramp capacitor 334 to discharge through the discharge resistor 336 and the ramp voltage Vslope starts to ramp down. This causes the summation voltage Vsum to decrease over time. When the summation voltage Vsum drops below the reference voltage Vref, the output of the first comparator circuit 304 switches. For example, the output control signal Cout switches from a high value to a low value. Low value of output control signal Cout is sensed by the first PFM Control Circuit 310. The first PFM Control Circuit 310 generates corresponding gate signals PGATE and NGATE so as to turn off the second PFM switch 320 and turn on the first PFM switch 318. The first PFM switch 318 now couples the input voltage 108 to the first LC Inductor 322. Additionally, the ramp switch 338 is turned off and the ramp capacitor 334 starts to charge. This increases the ramp voltage Vslope. As soon as the first PFM switch 318 is turned on, current IL through the first LC inductor 322 starts ramping. Now, the voltage across first LC capacitor 324 starts to increase, thereby increasing the output voltage Vout. The summation circuit 332 adds the increasing ramp voltage Vslope and the increasing output voltage Vout, to generate the summation voltage Vsum. When the summation voltage Vsum reaches a value at least equal to Vref+Hc, the first comparator circuit 304 switches the output control signal Cout, say from a low value to a high value.

High value of output control signal Cout is sensed by the first PFM Control Circuit 310. The first PFM Control Circuit 310 generates corresponding gate signals PGATE and NGATE so as to turn off the first PFM switch 318 and turn on the second PFM switch 320. Turning off the first PFM switch 318 de-couples the input voltage 108 to the first LC Inductor 322. The turned on second PFM switch 320 couples the first LC inductor 322 to ground. The inductor current IL starts to ramp down. Additionally, the ramp switch 338 is turned on by signal PGATE. The ramp switch 338 couples the discharge resistor 336 to the ramp capacitor 334. The ramp capacitor 334 starts to discharge through the discharge resistor 336 and the ramp voltage Vslope starts to ramp down. As the inductor current IL ramps down, the voltage across the first LC capacitor 324 starts to drop and the output voltage Vout starts to drop. As both the output voltage Vout and the ramp voltage Vslope are dropping, the summation voltage Vsum also drops and soon reaches a value below reference voltage Vref. At this time, the output of the first comparator circuit 304, the control signal Cout switches. The cycle described above will repeat, as the summation voltage Vsum swings.

In this embodiment, upon proper selection and configuration of the ramp circuit 330, low ripple voltage can be achieved. Further, an optimal inductor current IL may be maintained over a wide range of load current. Additionally, the delta inductor current may be maintained with-in a given range. In this embodiment, the ripple voltage will be less than the hysteresis voltage Hc and may be designed to be within a certain range of value. Additionally, the PFM switching regulator may be configured to operate in a continuous mode, when the load current exceeds a certain limit. These principles will be further described with respect to an exemplary example design and with reference to exemplary waveforms described in FIGS. 4A and 4B.

Example Selection of Cslope and Islope

The hysteresis of the comparator circuit is equal to ramp voltage Vslope.

Hysterisis $Hc=V\text{slope}$ $$Hc=(I\text{slope}*T\text{on})/C\text{slope}, \quad \text{(Equation 1)}$$

where
Islope=capacitor charging current
Cslope=ramp capacitor value; and
Ton=time for which the first switch is on (or ramp switch is off).

Output ripple is described by the following equation $$V\text{ripple}=(V\text{in}/V\text{out})*(V\text{in}-V\text{out})*(T\text{on})^2* (\tfrac{1}{8}*L\text{out}*C\text{out}), \quad \text{(Equation 2)}$$

where
Vin=input voltage value
Vout=output voltage value
Lout=inductor value of first LC inductor 322
Cout=capacitance value of first LC capacitor 324.

By way of an example, for Lout=4.7 uH, Cout=20 uF, Vin=3.3V, Vout=1V, and Vripple=2 mV, Equation 2 when solved provides: Ton=450 nS.

For a desired hysteresis HC=15 mV, we get (Islope/Cslope)=15 m/450 n

For Islope of 0.2 uA, we get Cslope=6 pF.

Selection of Discharge Resistance Value
Rdisch=discharge resistor 336.
It is preferable to have Ton<Rdisch*Cslope<Toff
where $$T\text{off}=(V\text{in}-V\text{out})*T\text{on}*(1/V\text{out}) \quad \text{(Equation 3)}$$

By way of an example, for Ton=450 nS, Vin=3.3V, Vout=1V, and Cslope=6 pF, Equation 3 when solved provides: 75 k<Rdisch<172.5 k.

Discontinuous and Continuous Mode

Discontinuous mode is when the inductor current IL goes to zero during operation and continuous mode is when the inductor current IL is greater than zero during operation.

The current through the first PFM switch 318 when it is on is $$dL_L=(V\text{in}-V\text{out})*T\text{on}*(1/L\text{out}) \quad \text{(Equation 4)}$$

By way of an example, for Ton=450 nS, Vin=3.3V, Vout=1V, and Lout=4.7 uH, Equation 4 when solved for $dL_L$ provides: $dL_L$=220 mA.

For load current IRL<($dL_L$/2), here, load current of 110 mA, the switching regulator will operate in discontinuous mode. For load current IRL>110 mA, the switching regulator will operate in continuous mode. Once the load current is greater than a certain load current (referred to as mode switching load current), in this example, $dL_L$/2, the switching regulator operates in continuous mode. Once the load current is greater than the mode switching load current, the Ton and Toff are fixed for a given Vin and Vout value. So, the frequency of operation of the switching regulator will be fixed for all load currents greater than the mode switching load current.

Using above design criteria as an example, waveforms of FIGS. 4A and 4B will now be described.

Figure 4A:
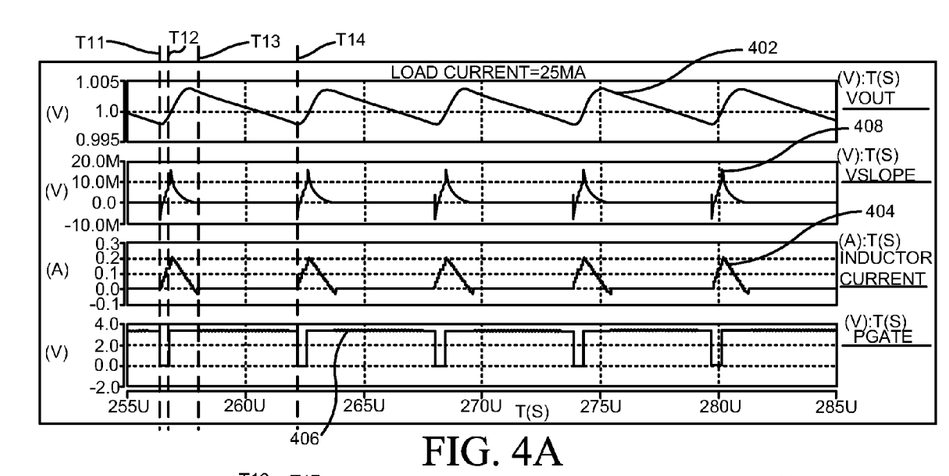
FIG. 4A illustrates voltage and current waveforms of exemplary PFM switching regulator of FIG. 3, under a low load current condition.

FIG. 4A illustrates voltage and current waveforms of PFM switching regulator 300 of FIG. 3, under a low load current condition. In this example, the load current IRL is 25 mA, reference voltage Vref=1 V and hysteresis Hc=15 mV. For example, waveform 402 depicts the output voltage Vout in Volts over time, waveform 404 depicts the inductor current IL in milliamps (mA) over time, waveform 406 depicts gate signal PGATE in Volts applied to first switch 318 and waveform 408 depicts the ramp voltage Vslope. X-axis depicts the time t(s) in microseconds (uSec) for all four waveforms 402-408. Now referring to FIG. 4A, at about time T11, as the output voltage Vout drops below Vref of 1 Volts, the gate signal PGATE is asserted, the first PFM switch 318 is turned on and ramp switch 338 is turned off. Then, the inductor current IL starts to ramp up. Additionally, the ramp voltage Vslope starts to ramp up. The output voltage Vout also increases during this period. The summation voltage Vsum, which is a sum of the ramp voltage Vslope and output voltage Vout also increases.

When the summation voltage Vsum raises above Vref+Hc (here Vref=1V and Hc=15 my or 0.015 V), at about time T12, the gate signal PGATE is deasserted and the first PFM switch 318 is turned off and second PFM switch 320 is turned on. Additionally, the ramp switch 338 is turned on. The ramp capacitor 334 discharges through the discharge resistor 336 and the ramp voltage Vslope starts to ramp down and eventually reach ground potential. The inductor current IL continues to flow until it ramps down to 0 amps at time T13. The output voltage Vout continues to raise till inductor current is equal to IRL during this period. After the inductor current IL ramps down to 0 amps at time T13, the output voltage Vout now continues to ramp down during the period T13-T14, at which time, the output voltage Vout drops below the reference voltage Vref. Until time T14, the inductor current IL is substantially zero. Then, the gate signal PGATE is asserted and the cycle as described above repeats. As one skilled in the art appreciates, the peak inductor current under these conditions is about 0.2 mA. Low inductor current is about 0 mA. The delta inductor current is about 0.2 mA. Ripple in output voltage Vout is about 5 mV, which is significantly less than the hysteresis Hc of 15 mV. The switching regulator is operating in discontinuous mode, under this low load current condition, as the inductor current is substantially zero during the time period T13-T14.

Figure 4B:
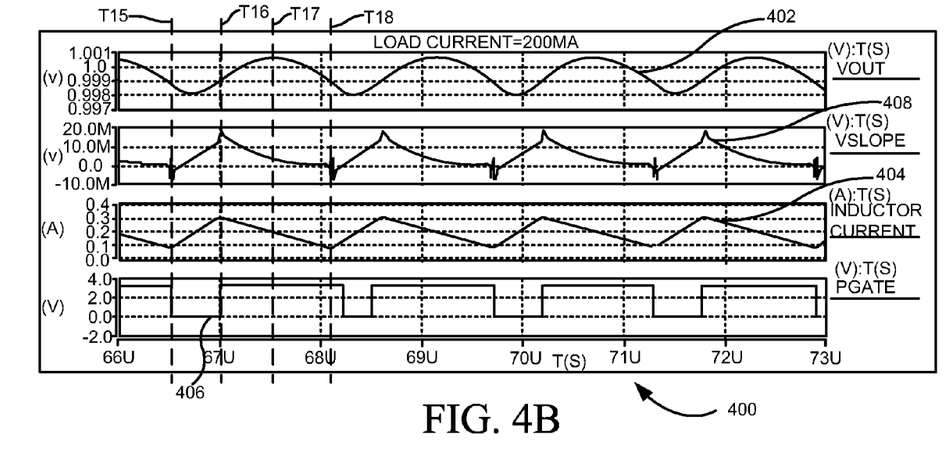
FIG. 4B illustrates voltage and current waveforms of exemplary PFM switching regulator of FIG. 3, under a high load current condition.

FIG. 4B illustrates voltage and current waveforms of exemplary PFM switching regulator 300 of FIG. 3, under a high load current condition. In this example, the load current IRL is about 200 mA, which is higher than the mode switching load current (which in this example is 110 mA). All other parameters are same, for example, reference voltage Vref=1 V and hysteresis Hc=15 mV. For example, waveform 402 depicts the output voltage Vout in Volts over time, waveform 404 depicts the inductor current IL in milliamps (mA) over time, waveform 406 depicts gate signal PGATE in Volts applied to first PFM switch 318 and waveform 408 depicts the ramp voltage Vslope. X-axis depicts the time t(s) in microseconds (uSec) for all four waveforms 402-408. Now referring to FIG. 4B, at about time T15, as the output voltage Vout drops below Vref of 1 Volts, the gate signal PGATE is asserted and the first PFM switch 318 is turned on and the ramp switch 338 is turned off. Then, the inductor current IL starts to ramp up. The output voltage Vout increases during this period. Additionally, the ramp voltage Vslope starts to ramp up. The summation voltage Vsum, which is a sum of the ramp voltage Vslope and output voltage Vout also increases.

When the summation voltage Vsum raises above Vref+Hc (here Vref=1V and Hc=15 my or 0.015 V), at about time T16, the gate signal PGATE is deasserted and the first PFM switch 318 is turned off and second PFM switch 320 is turned on. The ramp switch 338 is turned on. The ramp voltage Vslope starts to ramp down to zero volts. The inductor current IL continues to flow and ramps down to about 0.2 mA at time T17. The output voltage Vout continues to raise during this period. After the inductor current IL ramps down below 0.2 mA at time T17, the output voltage Vout now continues to ramp down during the period T17-T18. The summation voltage Vsum which is a sum of the output voltage Vout and ramp voltage Vslope drops below the reference voltage Vref. Until time T18, the inductor current IL is continuing to ramp down, to about 0.1 mA. Then, the gate signal PGATE is asserted and the cycle as described above repeats.

As one skilled in the art appreciates, referring to FIG. 4B, the peak inductor current under these conditions is about 0.3 mA and low inductor current is about 0.1 mA, giving a delta inductor current of about 0.2 mA. Ripple in output voltage Vout is less than 3 mV, which is significantly less than the hysteresis Hc of 15 mV. The switching regulator is operating in continuous mode, under this load current condition, as the inductor current is above zero during the time period T11-T18. The delta inductor current is about 200 mA. As previously described, the switching frequency of the switching regulator remains the same in continuous mode, with delta inductor current of about 200 mA and peak inductor current of about 300 mA. Additionally, the delta inductor current is substantially same as the delta inductor current under low load current condition, as previously described with reference to FIG. 4A.

Figure 5:
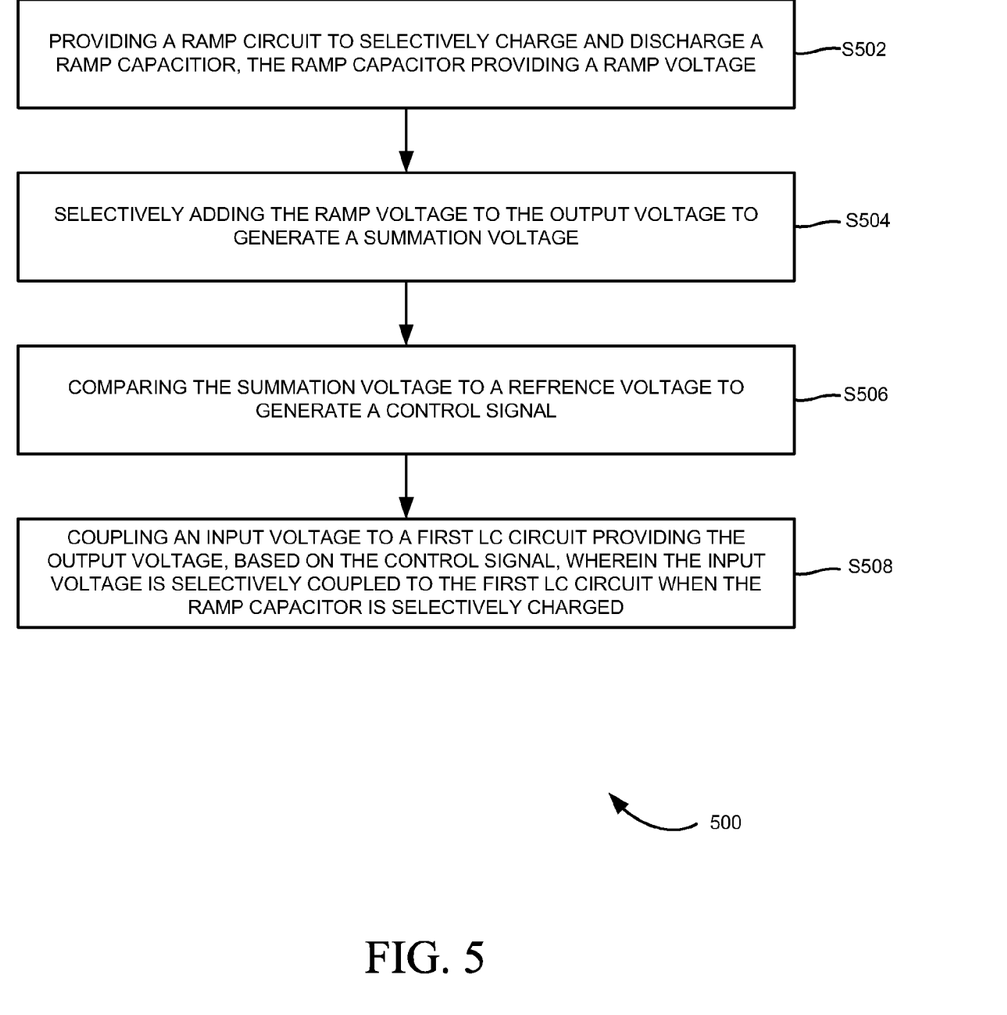
FIG. 5 illustrates an exemplary method for controlling ripple in an output of an exemplary PFM switching regulator.

Now, referring to FIG. 5, a method 500 for controlling ripple in an output of an exemplary PFM switching regulator will be described. In block S502, a ramp circuit is provided to selectively charge and discharge a ramp capacitor. The ramp capacitor provides a ramp voltage. For example, the ramp circuit 330 is provided. The ramp capacitor 334 is selectively charged by the ramp current source 340. The discharge resistor 336 in combination with ramp switch 338 selectively discharges the ramp capacitor 334. The ramp capacitor 334 provides a ramp voltage Vslope.

In block S504, the ramp voltage is selectively added to the output voltage to generate a summation voltage. For example, the ramp voltage Vslope is selectively added to the output voltage Vout using the summation circuit 332. The summation circuit 332 generates the summation voltage Vsum by adding the ramp voltage Vslope and output voltage Vout.

In block S506, the summation voltage is compared to a reference voltage to generate a control signal. For example, the summation voltage Vsum is compared to the reference voltage Vref by the first comparator circuit 304 to generate the control signal Cout.

In block S508, an input voltage is coupled to a first LC circuit providing the output voltage, based on the control signal. The input voltage is selectively coupled to the first LC circuit when the ramp capacitor is selectively charged. For example, the input voltage Vin is coupled to the first LC circuit 306, based on the control signal Cout. The control signal Cout is used by the first PFM control circuit 310 to selectively turn on first PFM switch 318 to couple the input voltage Vin to the first LC circuit 306. Based on the control signal Cout, Signal PGATE is generated by the first PFM control circuit 316 to turn on the first PFM switch 318. Additionally, the signal PGATE turns off the ramp switch 328. This causes the ramp capacitor 334 to charge.

All or at least a portion of the system and method of the present invention may be implemented in an integrated circuit, in discrete components, in software, or in any combination thereof. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary circuits illustrated in FIG. 1 or 3, or portions thereof, may be part of an integrated circuit. Integrated circuits so manufactured are considered part of this invention. An integrated circuit in accordance with the present invention can be employed in essentially any application and/or electronic system in which a switching regulator is utilized. Suitable systems for implementing techniques of the invention may include, but are not limited, to network processors, Ethernet PHY devices, adaptive voltage scaling systems etc. Systems incorporating such integrated circuits are considered part of this invention.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method of controlling ripple in an output voltage of a switching regulator, comprising:
    providing a ramp circuit to selectively charge and discharge a ramp capacitor, the ramp capacitor providing a ramp voltage;
    selectively adding the ramp voltage to the output voltage to generate a summation voltage;
    comparing the summation voltage to a reference voltage using a first comparator circuit to generate a control signal, wherein the first comparator circuit operates with hysteresis wherein, relative to the reference voltage, the first comparator circuit switches the control signal from high to low at a first summation voltage level different from a second summation voltage level at which the first comparator circuit switches the control signal from low to high; and
    coupling an input voltage to an LC circuit based on the control signal, the LC circuit providing the output voltage, wherein the input voltage is selectively coupled to the LC circuit, when the ramp capacitor is selectively charged.

2. The method of claim 1, further including selectively decoupling the input voltage from the LC circuit, when the ramp capacitor is selectively discharged.

3. The method of claim 2, wherein the switching regulator operates in a continuous mode, when the switching regulator is supplying a load current greater than a mode switching load current.

4. The method of claim 3, wherein the LC circuit comprises an inductor and a capacitor coupled in series, the voltage across the capacitor providing the output voltage, an inductor current flowing through the inductor, wherein the inductor current is greater than zero when the switching regulator operates in the continuous mode.

5. The method of claim 4, wherein a delta inductor current flowing through the inductor is substantially the same when the switching regulator operates in the continuous mode and when the switching regulator operates in a discontinuous mode.

6. The method of claim 4, wherein based on the control signal, either a first switch selectively couples the input voltage to the inductor, when a second switch is coupled to the inductor is turned off; or the first switch selectively decouples the input voltage to the inductor, when the second switch is selectively turned on to couple the inductor to a ground potential.

7. The method of claim 2, wherein based on the control signal, a ramp switch selectively couples and decouples the ramp capacitor to a discharge resistor.

8. The method of claim 1, wherein:

the first comparator circuit has a hysteresis voltage level equal to a difference between the first summation voltage level and the second summation voltage level; and the ripple in the output voltage is less than the hysteresis voltage level of the first comparator circuit.

9. A switching regulator, comprising:

a ramp circuit configured to selectively charge and discharge a ramp capacitor, the ramp capacitor providing a ramp voltage;

a summation circuit to add the ramp voltage to an output voltage of the switching regulator to generate a summation voltage;

a comparator circuit to compare the summation voltage to a reference voltage to generate a control signal, wherein the comparator circuit operates with hysteresis wherein, relative to the reference voltage, the comparator circuit switches the control signal from high to low at a first summation voltage level different from a second summation voltage level at which the comparator circuit switches the control signal from low to high; and a first control circuit configured to couple an input voltage to an LC circuit based on the control signal, the LC circuit providing the output voltage, and wherein the input voltage is selectively coupled to the LC circuit, when the ramp capacitor is charged.

10. The switching regulator of claim 9, wherein the input voltage is selectively decoupled from the LC circuit, when the ramp capacitor is discharged.

11. The switching regulator of claim 9, wherein, when the switching regulator is supplying a load current greater than a mode switching load current, the switching regulator operates in a continuous mode.

12. The switching regulator of claim 11, wherein the LC circuit comprises an inductor and a capacitor coupled in series, the voltage across the capacitor providing the output voltage, an inductor current flowing through the inductor, and wherein the inductor current is greater than zero, when the switching regulator operates in the continuous mode.

13. The switching regulator of claim 12, wherein a delta inductor current flowing through the inductor is substantially same when the switching regulator operates in the continuous mode and when the switching regulator operates in a discontinuous mode.

14. The switching regulator of claim 11, wherein based on the control signal, a first switch selectively couples the input voltage to the inductor, when a second switch coupled to the inductor is turned off; and the first switch selectively decouples the input voltage to the inductor, when the second switch selectively turned on to couple the inductor to a ground potential.

15. The switching regulator of claim 12, wherein based on the control signal, a ramp switch selectively couples and decouples the ramp capacitor to a discharge resistor.

16. The switching regulator of claim 9, wherein:

the first comparator circuit has a hysteresis voltage level equal to a difference between the first summation voltage level and the second summation voltage level; and the ripple in the output voltage is less than the hysteresis voltage level of the comparator circuit.

17. The switching regulator of claim 9, wherein at least a portion of the regulator is fabricated as an integrated circuit.

* * * * *